United States Patent
Abouimrane et al.

(10) Patent No.: US 8,168,333 B2
(45) Date of Patent: May 1, 2012

(54) PLASTIC CRYSTAL ELECTROLYTE FOR LITHIUM BATTERIES

(75) Inventors: All Abouimrane, Gatineau (CA); Isobel Davidson, Orleans (CA)

(73) Assignee: National Research Council of Canada, Ottawa, ON ( * ) Notice: Subject to any disclaimer, the term of this patent is extended or adjusted under 35 U.S.C. 154(b) by 884 days.

(21) Appl. No.: 11/989,472

(22) PCT Filed: Jun. 16, 2006

(86) PCT No.: PCT/CA2006/001001
§ 371 (c)(1),
(2), (4) Date: Sep. 3, 2008

(87) PCT Pub. No.: WO2007/012174
PCT Pub. Date: Feb. 1, 2007

(65) Prior Publication Data
US 2009/0092902 A1    Apr. 9, 2009

Related U.S. Application Data

(60) Provisional application No. 60/703,451, filed on Jul. 29, 2005.

(51) Int. Cl.
*H01M 10/0564* (2010.01)
*H01M 4/48* (2010.01)
*H01M 4/58* (2010.01)

(52) U.S. Cl. ............... 429/306; 429/322; 429/231.95; 429/221

(58) Field of Classification Search ............. 429/306, 429/324, 326, 200, 231.95, 303
See application file for complete search history.

(56) References Cited

U.S. PATENT DOCUMENTS

| | | | | |
|---|---|---|---|---|
| 5,589,295 | A * | 12/1996 | Derzon et al. | 429/303 |
| 6,277,525 | B1 * | 8/2001 | Yamamoto et al. | 429/326 |
| 2004/0241546 | A1 * | 12/2004 | Hatta et al. | 429/231.1 |
| 2006/0024584 | A1 | 2/2006 | Kim et al. | |

FOREIGN PATENT DOCUMENTS

CA    2435218    1/2005

OTHER PUBLICATIONS

Long, S., et al "Ionic Conduction in Doped Succinonitrile" Nov. 10, 2004, Solid State Ionics, 175 (1-4) pp. 733-738.
Abouimrane, A., et al "Plastic Crystal-lithium Batteries: An Effective Ambient Temperature ..." Jun. 4, 2004, Journal of the Electrochemical Society, 151(7), p. A1028.
Alarco, P.-J. et al, "The Plastic-Crystalline Phase of Succinonitrile as a Universal Matrix for ..." Jun. 13, 2004 Nature Materials, 3 (7), pp. 476-481.

* cited by examiner

*Primary Examiner* — Jonathan Crepeau
*Assistant Examiner* — Kenneth Douyette
(74) *Attorney, Agent, or Firm* — Wayne Anderson

(57) ABSTRACT

A solid ionic electrolyte having a neutral organic plastic crystal matrix doped with an ionic salt may be used in an electrochemical device having an anode comprising a Li-containing material having an electrochemical potential within about 1.3 V of lithium metal. Electrochemical devices are disclosed having a cathode, an anode of a Li-containing material having an electrochemical potential within about 1.3 V of lithium metal, and a solid ionic electrolyte having a neutral organic plastic crystal matrix doped with an ionic salt. Such devices have high energy density delivery capacity combined with the favorable properties of a neutral organic plastic crystal matrix such as succinonitrile.

6 Claims, 4 Drawing Sheets

PLASTIC CRYSTAL ELECTROLYTE FOR LITHIUM BATTERIES

CROSS-REFERENCE APPLICATIONS

This application is a National Stage application of PCT Application PCT/CA2006/001001 filed Jun. 16, 2006 which claims benefit of U.S. Provisional Application 60/703,451 filed Jul. 29, 2005.

FIELD OF THE INVENTION

The present invention relates to plastic crystal solid electrolytes in lithium-based electrochemical devices.

BACKGROUND OF THE INVENTION

During the last ten years, primary and secondary (rechargeable) lithium batteries have been the object of considerable research and development. The aim is to develop a low cost battery, with a large energy content and good electrical performance. With this in mind, a large number of battery designs have been developed to comply with various applications such as portable products, un-interruptible power supplies (UPS), batteries for zero-emission and hybrid electric vehicles, and automotive start-light-ignition (SLI).

While the focus to date has been on Li-ion batteries that use liquid electrolytes, this technology's basic design creates problems in terms of packaging, format, size, cost, and safety [1]. Ionically conducting solid materials display many advantages over liquids as electrolytes. Polymers offer some advantages in terms of safety and mechanical characteristics over liquid electrolyte systems, and can also be used with lithium metal anodes [2]. Lithium metal anodes provide the highest theoretical capacity density. The mechanical properties of polymer electrolytes decrease problems that might arise from the formation of dendrites that can occur when using lithium metal as the anode. The problem for polymer electrolytes is their low conductivity at room temperature. To overcome this limitation, many approaches have been proposed such as polymer gel electrolytes formed by the introduction of plasticizers or the addition of small molecule additives into the polymer. More recently, plastic crystal electrolytes have been proposed [3, 4, 5, 6]. With conductivities as high as $10^{-3}$ S·cm$^{-1}$ at room temperature and good mechanical properties, crystal plastic electrolytes are one of the most promising alternatives to liquid or gelled electrolytes. Furthermore, in comparison to polymer electrolytes, the preparation of a plastic crystal electrolyte is very easy, does not require much addition of a lithium salt, and doesn't need any solvent or radiation cross-linking.

Plastic crystals are mesophases formed mainly by quasi-spherical or disk-like molecules exhibiting rotational and/or orientational disorder while retaining the long-range translational order [7]. A result of this type of "disorder" is the high diffusivity and plasticity that enables plastic crystals to compete with other materials with similar mechanical properties such as polymer electrolytes. The potential of these phases as ion-conducting materials became evident in a publication reporting high ionic conductivities for organic salts based on quaternary ammonium salts [8].

More specifically for lithium battery applications, high ionic conductivities have been reported for plastic crystal phases based on succinonitrile doped with certain lithium salts [5,6]. The plastic crystal properties of neat succinonitrile (abbreviated as SCN) have been characterized in some detail previously [9]. Succinonitrile exhibits plastic crystal formation at temperatures between −40° C. and 58° C. [9]. In the liquid and plastic crystal form, succinonitrile exists in rotational isomers: gauche and trans. However, at temperatures below −44° C. only the gauche form exists [10]. When doped with 5 mol % of lithium bis-trifluoromethanesulphonylimide (Li(CF$_3$SO$_2$)$_2$N), the plastic crystal range is reduced to between −34° C. and 49° C. [5]. While doping with 5 mol % of lithium tetrafluoroborate (LiBF$_4$) shifts the plastic crystal phase to between −36° C. and 44° C. [5]. The conductivities of these succinonitrile-lithium salts phases have already been discussed in prior publications [4,5]. Amongst the lithium salts evaluated, Li(CF$_3$SO$_2$)$_2$N and LiBF$_4$ show the highest conductivities with succinonitrile in the crystal plastic form with conductivities above $10^{-3}$ S·cm$^{-1}$ for Li(CF$_3$SO$_2$)$_2$N and $10^{-4}$ S·cm$^{-1}$ for LiBF$_4$ at room temperature [5]. These conductivities are good enough to use these electrolytes in lithium batteries at room temperature. Li(CF$_3$SO$_2$)$_2$N-succinonitrile electrolytes have already been demonstrated and quite good electrochemical performances have been obtained using Li(CF$_3$SO$_2$)$_2$N-succinonitrile with a Li$_4$Ti$_5$O$_{12}$ anode and either LiFePO$_4$ or LiCoO$_2$ as the cathode material [6]. However, for theses batteries, the voltage output is only about 2 V, and consequently, they can not deliver high energy densities.

Canadian patent application 2,435,218 [12] discloses the use of lithium titanate anodes in electrochemical cells comprising a succinonitrile (NC—CH$_2$—CH$_2$—CN) plastic crystal electrolyte. However, the electrochemical potential of lithium titanate is weak (−1.5 V vs. standard hydrogen electrode) compared to the electrochemical potential of lithium metal (−3.045 V vs. standard hydrogen electrode), therefore electrochemical cells based on lithium titanate are incapable of delivering high energy density. For electrochemical cells incorporating succinonitrile, it was believed that lithium metal, and therefore materials having an electrochemical potential similar to lithium metal, could not be used as the anode due to the possibility of reactivity between —CN group and lithium metal [5], resulting in polymerization of the succinonitrile.

There remains a need in the art for an electrochemical device that enjoys the benefits of a solid ionic electrolyte having a neutral organic plastic crystal matrix while being capable of delivering higher energy densities.

SUMMARY OF THE INVENTION

Surprisingly it has now been found that lithium metal and materials having an electrochemical potential similar to lithium metal can be successfully used as an anode in an electrochemical device utilizing a solid ionic electrolyte having a neutral organic plastic crystal matrix.

According to one aspect of the invention, there is provided a use of a solid ionic electrolyte having a neutral organic plastic crystal matrix doped with an ionic salt in an electrochemical device having an anode comprising a Li-containing material having an electrochemical potential within about 1.3 V of lithium metal.

According to another aspect of the invention, an electrochemical device is provided comprising: a solid ionic electrolyte having a neutral organic plastic crystal matrix doped with an ionic salt; an anode comprising a Li-containing material having an electrochemical potential within about 1.3 V of lithium metal; and, a cathode.

Advantageously, electrochemical devices of the present invention have a large voltage differential between the anode and cathode leading to the delivery of higher energy density, while maintaining the advantages of the neutral organic plastic crystal matrix, for example, its neutrality, its high diffusivity, its excellent chemical stability, its excellent mechanical properties, its excellent range of plasticity (−35° C. to 60° C. for succinonitrile) and its large stable electrochemical window. Preferred are neutral organic plastic crystals that exhibit high polarity, which imparts excellent solvating ability for lithium salts. The advantage of a highly polar, neutral organic plastic crystal is its excellent conductivity at room temperature when doped with an ionic salt.

The anode preferably has a potential within about 1.2 V of lithium metal, more preferably within about 1.1 V of lithium metal, even more preferably within about 1 V of lithium metal, for example within about 0.8 V of lithium metal or within about 0.5 V of lithium metal. The anode comprises a Li-containing material, for example lithium metal, lithium intercalated into hard or soft carbon, lithium intercalated into an oxide, a nitride or a phosphide, lithium inserted into a compound or composite by displacement, a lithium alloy, or a mixture thereof. Preferably, the Li-containing material comprises lithium metal, a lithium alloy, lithium intercalated into hard or soft carbon (e.g. lithium intercalated into graphite), or a mixture thereof. Compounds and composites in which lithium may be inserted may comprise, for example, Sn compounds, Sb compounds, Al compounds, transition metal oxides, transition metal nitrides or transition metal phosphides (e.g. $Cu_2Sb$, $CoSb_3$, $SnFe_2$, $Sn_5Cu_6$, $Mn_2Sb$, tin oxide, silicon oxide, cobalt oxide, $Cu_3P$, $FeP_2$, and $Li_{2.6}Co_{0.4}N$). Alloys of lithium may comprise, for example, lithium alloyed with Si, Sb, Al, Bi, Sn and/or Ag.

The solid ionic electrolyte has a neutral organic plastic crystal matrix. Such matrices are uncharged. Preferably, the neutral organic plastic crystal matrix comprises succinonitrile. The neutral organic plastic crystal matrix is doped with a dopant comprising an ionic salt, for example a lithium salt. The lithium salt is preferably a lithium salt of a fluorinated compound, more preferably a lithium salt of a fluorinated sulphonylimide. Some examples of suitable lithium salts are lithium bis-trifluoromethanesulphonylimide ($Li(CF_3SO_2)_2N$, sometimes abbreviated as LiTFSI), lithium bis-perfluoro-ethylsulphonylimide ($Li(C_2F_5SO_2)_2N$), lithium tetrafluoroborate ($LiBF_4$), lithium hexafluorophosphate ($LiPF_6$), lithium thiocyanate (LiSCN), lithium triflate ($LiCF_3SO_3$), lithium tetrafluoroaluminate ($LiAlF_4$), lithium perchlorate ($LiClO_4$) and mixtures thereof. The dopant is preferably $Li(CF_3SO_2)_2N$ or $LiBF_4$. In one embodiment, the solid ionic electrolyte comprises succinonitrile doped with $Li(CF_3SO_2)_2N$. The dopant may be incorporated into the neutral organic plastic crystal matrix in any suitable amount, for example, in an amount of from 1-20 mol %, more preferably in an amount of from 2-17 mol % or from 2-15 mol % or from 2-12 mol %. During discharge or charge of the electrochemical device, the solid ionic electrolyte ensures transport of ionic species from one electrode to the other, even inside a composite electrode.

The cathode may be any material suitable for use as a counter-electrode in an electrochemical device where the electrolyte is a neutral organic plastic crystal matrix doped with an ionic salt. The cathode may comprise an insertion compound comprising lithium ions reversibly or non-reversibly inserted into an atomic framework. The atomic framework may comprise, for example, a single metal oxide, a mixed metal oxide, a single metal phosphate, a mixed metal phosphate, a single metal vanadate or a mixed metal vanadate. The metal is preferably one or more first row transition metals. Examples of suitable cathode materials include $LiCoO_2$, $Li(Ni, Co)O_2$, $LiMn_2O_4$, $Li(Mn_{0.5}Ni_{0.5})O_2$, $Li_{1+x}(Mn,Ni, Co)_{1-x}O_2$, $LiFePO_4$ and $V_2O_5$.

Neutral organic plastic crystal electrolytes, particularly those formed from succinonitrile and lithium salts, can replace polymer and liquid electrolytes in electrochemical devices comprising high potential Li-containing anodes. Such electrochemical devices include, for example, electrochemical cells (e.g. batteries), fuel cells, electrochromic devices, supercapacitors and chemical sensors. The present invention is particularly well suited to commercial lithium battery applications such as rechargeable batteries for portable electronics and electric vehicles or hybrid electric vehicles. Furthermore, since the salt doped neutral organic plastic crystal electrolytes have good conductivity (e.g. about $10^{-4}$-$10^{-5}$ mS/cm) at lower temperature (e.g. about −20° C.), electrochemical devices of the present invention could be used in specific aerospace applications.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION OF THE INVENTION

Example 1

2.3066 g succinonitrile ($NC-CH_2-CH_2-CN$) and 0.1125 g of lithium tetrafluoroborate ($LiBF_4$) were mixed, heated until melting and then cooled to make a solid solution of composition 96% SCN-4% $LiPF_4$ (based on mol %). This compound was shown by differential scanning calorimetry (DSC) to have a melting point of 51° C. and to exhibit crystal plastic phase behaviour between −35° C. and 51° C. The characterization of the compound's conductivity versus temperature is provided in Table 1 below. The same data is plotted in FIG. 1.

TABLE 1

| | Temperature (° C.) | | | | | | | |
|---|---|---|---|---|---|---|---|---|
| | −10 | 0 | 10 | 20 | 30 | 40 | 50 | 60 |
| $\log_{10}$ (Conductivity) | −5.95 | −5.86 | −5.46 | −3.96 | −3.26 | −2.79 | −2.43 | −2.35 |

Example 2

Figure 1:
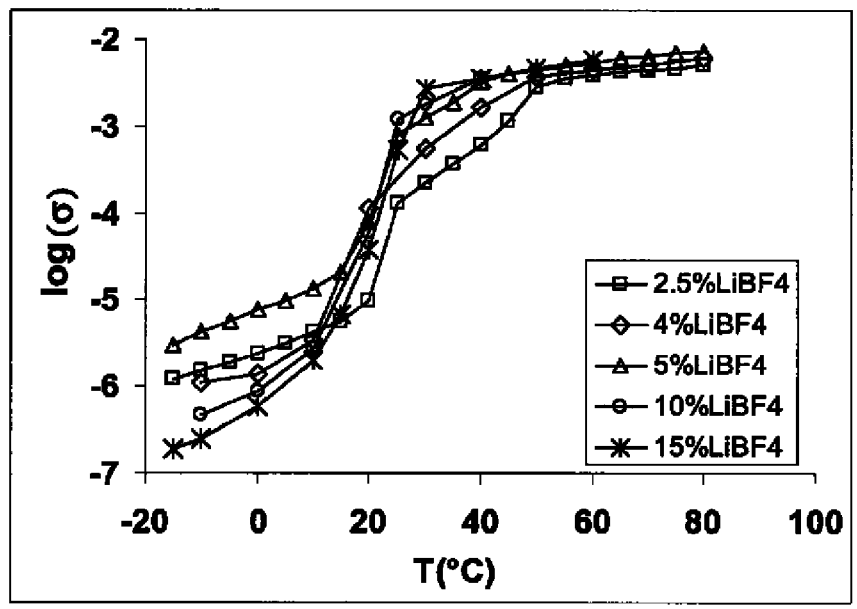
FIG. 1 is a graph depicting variation in log of conductivity as a function of temperature (° C.) for compositions of 2.5, 4, 5, 10 and 15 mol % $LiBF_4$ in succinonitrile.

Mixtures of $LiBF_4$ and succinonitrile were prepared as in Example 1 for compositions of 2.5 mol %, 5 mol %, 10 mol % and 15 mol % $LiBF_4$. Measured conductivities as a function of temperature are shown in FIG. 1 as a plot of log conductivity (S/cm) versus temperature (° C.).

Example 3

2.3066 g succinonitrile ($NC—CH_2—CH_2—CN$) and 0.3445 g of lithium bis-trifluoromethanesulphonylimide $Li(CF_3SO_2)_2N$ (sometimes abbreviated as LiTFSI) were mixed, heated until melting and then cooled to make a solid solution of composition 96% SCN-4% $Li(CF_3SO_2)_2N$ (based on mol %).

Figure 2:
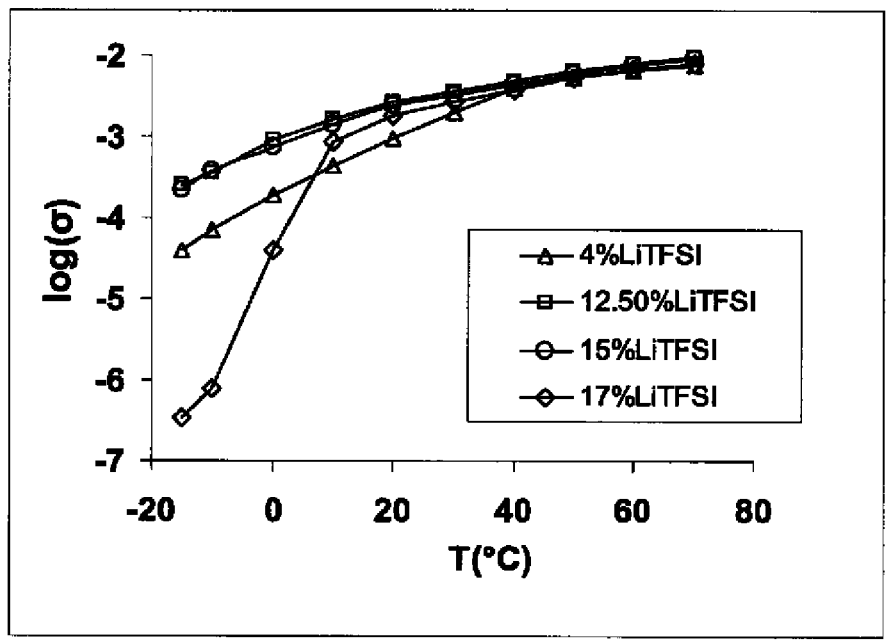
FIG. 2 is a graph depicting variation in log of conductivity as a function of temperature (° C.) for compositions of 4, 12.5, 15 and 17 mol % $Li(CF_3SO_2)_2N$ in succinonitrile.

This compound was shown by DSC to have a melting point of 58° C. and to exhibit crystal plastic phase behaviour between −36° C. and 58° C. The characterization of the compound's conductivity (S/cm) versus temperature is provided in Table 2 and plotted in FIG. 2.

TABLE 2

| | Temperature (° C.) | | | | | | | |
|---|---|---|---|---|---|---|---|---|
| | −10 | 0 | 10 | 20 | 30 | 40 | 50 | 60 |
| $\log_{10}$ (Conductivity) | −4.16 | −3.72 | −3.36 | −3.02 | −2.71 | −2.40 | −2.28 | −2.19 |

Example 4

Mixtures of $Li(CF_3SO_2)_2N$ and succinonitrile were prepared as in Example 3 for compositions of 4 mol %, 12.5 mol %, 15 mol % and 17 mol % $Li(CF_3SO_2)_2N$. Measured conductivities as a function of temperature are plotted in FIG. 2 as log conductivity (S/cm) versus temperature (° C.).

Example 5

Figure 3:
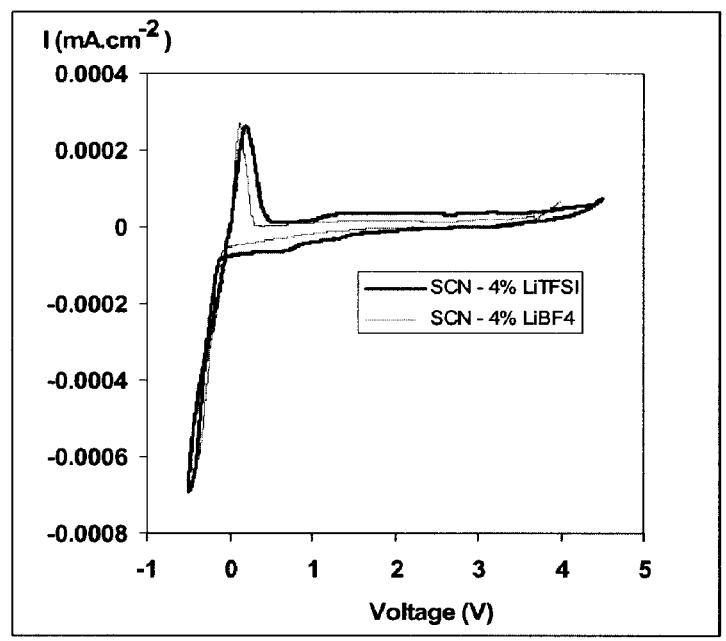
FIG. 3 is a graph depicting cyclic voltammograms obtained at room temperature of SCN-4% LiTFSI and SCN-4% $LiBF_4$ electrolytes using metallic lithium as blocking electrode and stainless steel as working electrode at scan rate of 1 $mV \cdot S^{-1}$.

In order to test the electrochemical stability of these compounds as electrolytes with lithium anodes, both SCN-4% $Li(CF_3SO_2)_2N$ and SCN-4% $LiBF_4$ (both based on mol %) were characterized by cyclic voltammetry (CV) at room temperature on a multichannel potentiostat (Solarton) in cells with electrolyte sandwiched between lithium and stainless steel electrodes. FIG. 3 shows the cyclic voltammograms, taken at room temperature at a scan rate of 1 mV/s, of SCN-4% $Li(CF_3SO_2)_2N$ and SCN-4% $LiBF_4$ electrolytes sandwiched between a stainless steel (SS) and a lithium metal electrode. For both SCN-4% $Li(CF_3SO_2)_2N$ and SCN-4% $LiBF_4$, the voltammogram clearly showed the deposition of metallic lithium at the cathodic limit and stripping of lithium in the returning anodic scan. SCN-4% $Li(CF_3SO_2)_2N$ was stable up to 4.5 volts versus $Li/Li^+$. This indicates that SCN-4% $Li(CF_3SO_2)_2N$ electrolytes are suitable for use with a broad range of cathode materials. For SCN-4% $LiBF_4$, the current responses were negligible below 3.9 volts versus $Li/Li^+$. This implies that there is no decomposition of any components in this potential region and SCN-4% $LiBF_4$ has a suitable electrochemical stability for 3.4 V cathode materials like $LiFePO_4$.

Example 6

In order to test the electrolyte with lithium metal anodes and various cathode materials, button type electrochemical cells (2325 size coin cells) were prepared. The electrolyte was prepared by combining 96 mol % of SCN with 4 mol % of $Li(CF_3SO_2)_2N$ (lithium trifluoromethanesulphonylimide) or with 4 mol % $LiBF_4$. The mixture was heated until melting.

Electrochemical cells were composed with lithium metal as anode and $LiFePO_4$ as cathode.

The negative electrode (anode) was a 1.65 cm diameter disk of lithium metal.

The positive electrode (cathode) was prepared by tape casting on an aluminum foil current collector a mixture constituted by 84 wt % $LiFePO_4$, 8 wt % KynarFlex polymer binder and 8 wt % Super S carbon black (as an electronic conductor enhancer) dissolved in N-methylpyrrolidinone. The cathode was dried at 85° C. The active material loading was about 4.5 $mg/cm^2$ and the geometric surface area of the cathode was always 1.5 $cm^2$.

A 25.4 μm thick micro-porous polypropylene separator (Celgard®) was inserted between the electrodes to prevent short-circuits. A small quantity of SCN-4% $Li(CF_3SO_2)_2N$ or SCN-4% $LiBF_4$ was deposited between the cathode and Celgard® separator and between the anode and Celgard® separator. A similar result was obtained when the Celgard® separator was simply immersed in a solution of SCN-4% $Li(CF_3SO_2)_2N$ or SCN-4% $LiBF_4$. A stainless steel spacer ensured effective current collection and an internal stainless steel spring kept the different elements of the cell stack in good contact within the coin cell casings. The coin cells were assembled and crimped at room temperature in a helium-filled glove box.

Figure 4:
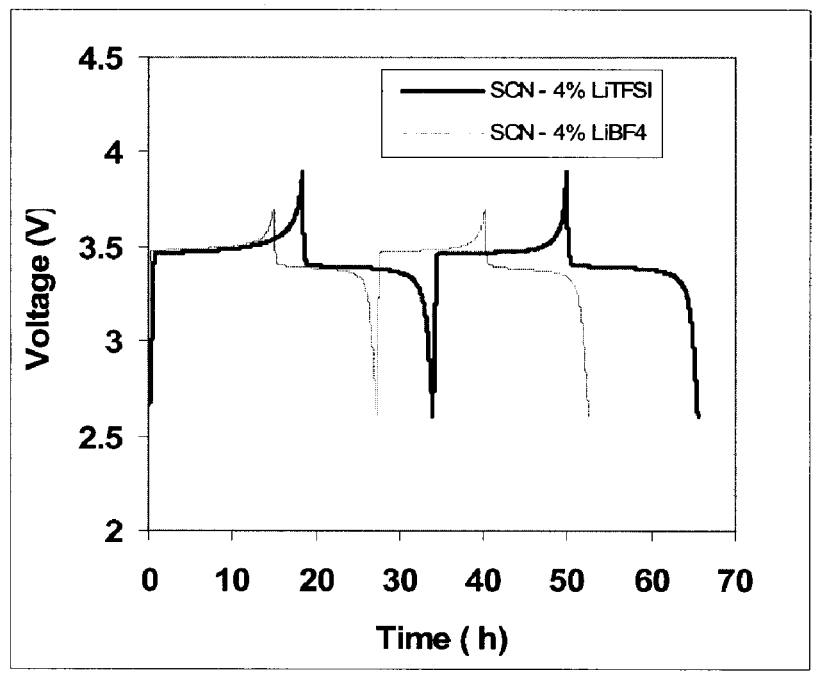
FIG. 4 is a graph depicting first and second galvanostatic (C/24 rate) charge-discharge cycles of Li/SCN-4% lithium salt/$LiFePO_4$ cells.

Lithium batteries using SCN-4% $Li(CF_3SO_2)_2N$ or SCN-4% $LiBF_4$ as electrolyte were tested in galvanostatic mode at C/24 rate between 2.6 and 3.9 V for $Li(CF_3SO_2)_2N$ and between 2.6 and 3.7 V for $LiBF_4$. The voltage profile of those batteries is plotted in FIG. 4. The $Fe^{3+}/Fe^{2+}$ couple is observed at 3.49 V and 3.50 V for $Li(CF_3SO_2)_2N$ and $LiBF_4$, respectively, on oxidation, and at 3.39 V and 3.38 V for $Li(CF_3SO_2)_2N$ and $LiBF_4$, respectively, on reduction. This difference of voltage indicates a moderate voltage polarization in the reversible electrochemical process consistent with reasonable rate performance.

The working voltage of these lithium metal cells at around 3.4 volts is far more broadly useful than that of the about 2 volts for the $Li_4Ti_5O_{12}$ cells reported previously [6]. Further, capacity retention on cycling (FIG. 5) was much better than that reported for the $Li_4Ti_5O_{12}/Li(CF_3SO_2)_2N$—SCN/$LiFePO_4$ cells of the prior art.

Figure 5:
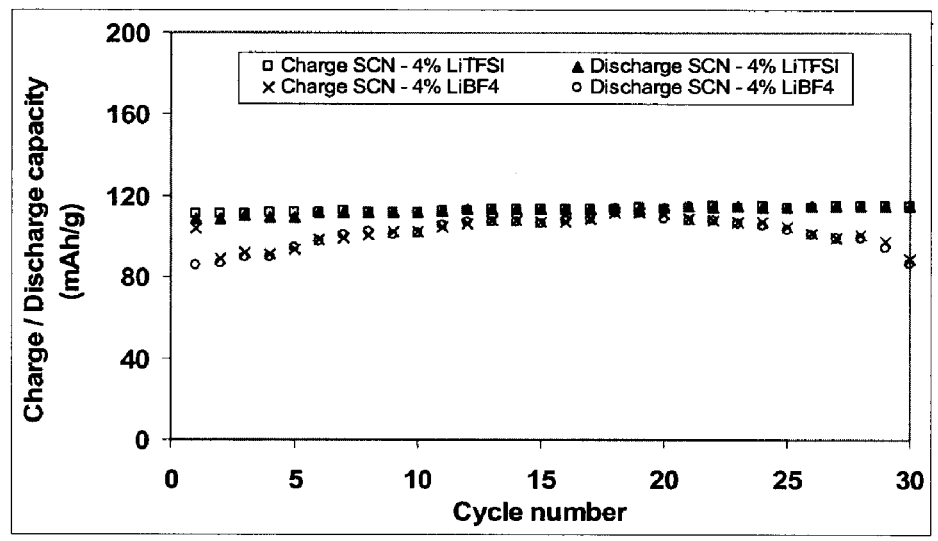
FIG. 5 is a graph depicting specific charge-discharge capacity vs. cycle number of Li/SCN-4% lithium salt/$LiFePO_4$ cells.

The Li/SCN-4% $Li(CF_3SO_2)_2N/LiFePO_4$ coin cell delivered more than 109 mAh/g in the first cycle and the capacity increased slightly on cycling to reach a maximum of 115 mAh/g at the $30^{th}$ cycle (FIG. 5). Coulombic efficiencies of 84% and 98% were observed on the first and second cycles respectively, which increased on further cycling to reach >99% from the $6^{th}$ cycle onwards. A similar result was obtained with the SCN-4% $LiBF_4$ electrolyte which exhibited a discharge capacity of 86 mAh/g and a charge/discharge efficiency of 83% on the first cycle. In both cases good cycling stabilities were obtained with very little capacity fade.

Example 7

Figure 6:
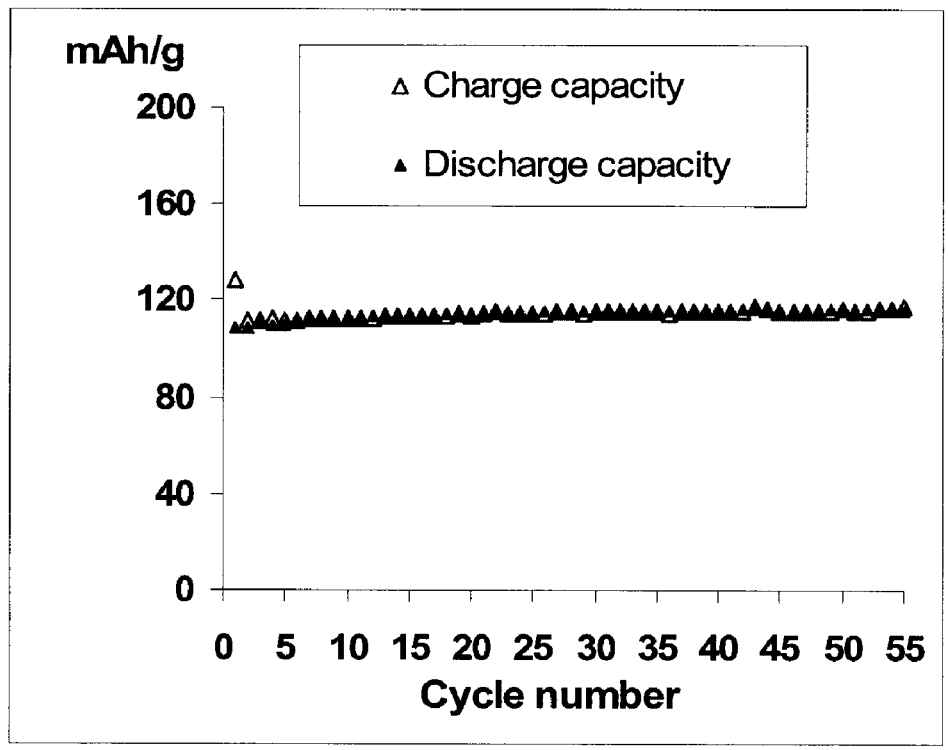
FIG. 6 is a graph depicting specific charge-discharge capacity vs. cycle number of Li/SCN-4% LiTFSI/$LiFePO_4$ cell.

In order to further evaluate the cycleability, a Li/SCN-4% Li(CF$_3$SO$_2$)$_2$N/LiFePO$_4$ cell was constructed as in Example 6 and cycled in galvanostatic mode on an Arbin cycler at current corresponding to a rate of C/24. The cell was cycled between voltage limits of 2.6 and 4.9 volts. The cell showed (FIG. 6) very good cycleability over 55 cycles with no capacity fade.

Example 8

Figure 7:
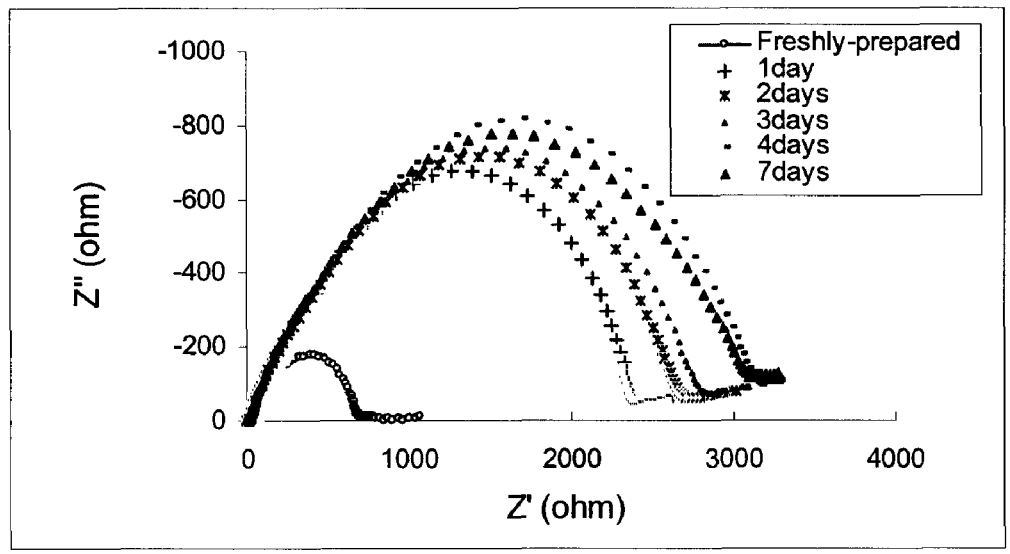
FIG. 7 is a graph depicting time dependence of impedance spectrum of Li/SCN-4% LiTFSI/Li cell; and, FIG. 8 is a graph depicting first and second galvanostatic (C/24 rate) charge-discharge cycles of Li/SCN-4% lithium salt/$LiCoO_2$ cells.

In order to assess whether or not a stable solid electrolyte interface (SEI) is formed between the lithium anode and the plastic crystal electrolyte, AC impedance spectra on a symmetrical Li/SCN-4% Li(CF$_3$SO$_2$)$_2$N/Li cell were measured as a function of time. The spectra (FIG. 7) demonstrate that a stable SEI forms after several days of contact between the anode and solid electrolyte. A stable SEI protects the electrode from degradation leading to stable charge/discharge cycling.

Example 9

Figure 8:
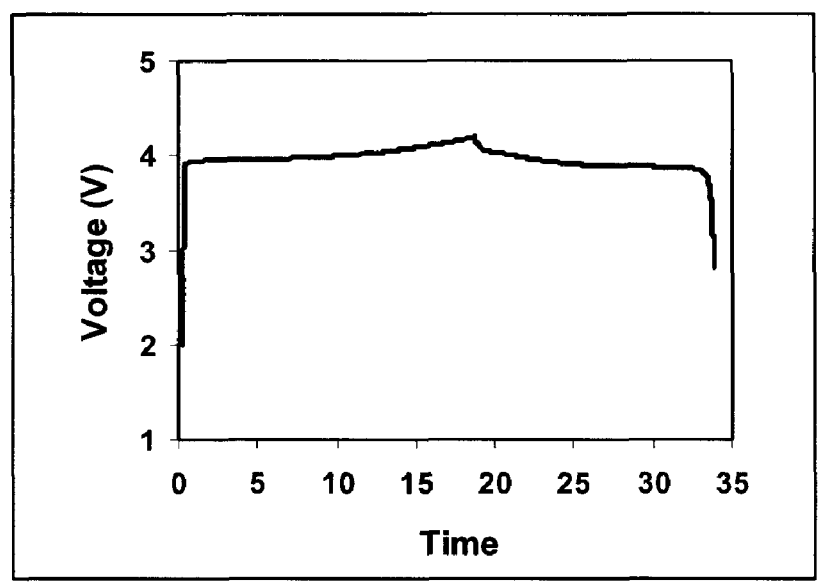

An electrochemical generator (2325 size coin cell) was made using a negative electrode of metallic lithium (1.65 cm diameter disk). The electrolyte was 4 mol % Li(CF$_3$SO$_2$)$_2$N in succinonitrile. The positive electrode contained a mixture of 84 wt % LiCoO$_2$, 8 wt % KynarFlex polymer binder and 8 wt % Super S carbon black (as an electronic conductor enhancer) dissolved in N-methylpyrrolidinone. The cathode was dried at 85° C. Active material loading was about 5.5 mg/cm$^2$ and geometric surface area of the cathode was 1.5 cm$^2$. The cell was cycled between 2.8 V and 4.2 V at C/24 rate. Charge capacity delivered was about 131.4 mAh/g and discharge capacity was about 105.3 mAh/g (see FIG. 8). In FIG. 8, Time is in hours.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

REFERENCES

1—A. Hammami, N. Raymond, and M. Armand, *Nature*, 424, 635 (2003).
2—Armand M. B. 'Fast Ion Transport in Solids', ed *W. Van Gool, North Holland, Amsterdam*, p. 665 (1973).
3—D. MacFarlane, J. Huang and M. Forsyth, *Nature*, 402, 792 (1999).
4—S. Long, D. R. MacFarlane, M. Forsyth, *Solid State Ionics*, 161, 105 (2003).
5—P. J. Alarco, Y. Abu-Lebdeh, A. Abouimrane, M. Armand, *Nature Materials*, 3, 476 (2004).
6—A. Abouimrane, Y. Abu-Lebdeh, P. J. Alarco and Michel Armand, *J. Electrochem. Soc.*, 151 (7), A1028 (2004).
7—J. N. Sherwood, *The Plastically Crystalline State*, Wiley, London, 1979.
8—I. E. Cooper and C. Angell, *Solid State Ionics*, 18-19, 570 (1986).
9—P. Derollez, J. Lefebvre, M Descamps, W. Press and H. Fontaine, *J. Phys. Condens. Matter*, 2, 6893 (1990).
10—E. Fitzgerald and J. Jantz, *J. Mol. Spectroscop.*, 1, 49 (1957).
11—S. Long, D. R. MacFarlane, M. Forsyth, *Solid State Ionics*, 175, 733 (2004).
12—CA 2,435,218, Y. Abu-Lebdeh et al., Jan. 28, 2005.
13—WO 0115258, D. R. MacFarlane et al., Mar. 1, 2001.

The invention claimed is:

1. A rechargeable electrochemical device comprising a solid ionic electrolyte having as a neutral organic plastic crystal matrix succinonitrile doped with a lithium salt of a fluorinated sulphonylimide, an anode comprising lithium metal, and a cathode comprising a material selected from the group consisting of LiCoO$_2$, LiFePO$_4$ and lithium metal.

2. The device of claim 1, wherein the ionic salt comprises lithium bis-trifluoromethanesulphonylimide.

3. The device of claim 2, wherein the cathode comprises LiFePO$_4$.

4. The device of claim 1, wherein the lithium salt is present in the amount of 1-20 mol % of succinonitrile.

5. The device of claim 4, wherein the lithium salt is lithium bis-trifluoromethanesulphonylimide.

6. The device of claim 4, wherein the electrolyte is succinonitrile-4 mol % lithium bis-trifluoromethanesulphonylimide.

* * * * *